(12) United States Patent
Cheng

(10) Patent No.: US 6,657,670 B1
(45) Date of Patent: Dec. 2, 2003

(54) DIAPHRAGM STRUCTURE OF DIGITAL STILL CAMERA

(75) Inventor: Jyi-Fang Cheng, Taipei (TW)

(73) Assignee: Teco Image Systems Co., Ltd., Taipei (TW)

( * ) Notice: Subject to any disclaimer, the term of this patent is extended or adjusted under 35 U.S.C. 154(b) by 0 days.

(21) Appl. No.: 09/270,668

(22) Filed: Mar. 16, 1999

(51) Int. Cl.<sup>7</sup> ............... G03B 7/00; H04N 5/235
(52) U.S. Cl. ............. 348/363; 348/374; 396/451
(58) Field of Search ............... 348/362, 363, 348/364, 365, 366, 367, 368, 369; 359/232, 233, 740, 227, 230, 739; 396/451, 506, 508, 449

(56) References Cited

U.S. PATENT DOCUMENTS

| | | | |
|---|---|---|---|
| 4,247,168 A | * 1/1981 | Mast | 359/705 |
| 4,827,348 A | * 5/1989 | Ernest et al. | 348/221.1 |
| 5,471,242 A | * 11/1995 | Kondo | 348/362 |

FOREIGN PATENT DOCUMENTS

JP 63048536 A * 3/1988 ............ G03B/9/02

* cited by examiner

*Primary Examiner*—Tuan Ho
*Assistant Examiner*—Jason Whipkey
(74) *Attorney, Agent, or Firm*—Rosenberg, Klein & Lee

(57) ABSTRACT

A diaphragm structure for digital still camera and arranged within digital still camera comprises a lens set, a first light-blocking plate having a first aperture, and a second light-blocking plate having a second aperture. The two light-blocking plates are movably arranged within the lens set and in abutting relationship. The two light-blocking plates are moved linearly with the lens set such that said two apertures can be aligned or staggered to each other and the operation of the lens set can be controlled. The diaphragm structure of the present invention can overcome the problem of complicated structure, high cost and the difficulty of placing the diaphragm within the lens set.

6 Claims, 7 Drawing Sheets

DIAPHRAGM STRUCTURE OF DIGITAL STILL CAMERA

FIELD OF THE INVENTION

The present invention relates to a diaphragm structure of digital still camera more particularly, to a diaphragm structure which has simple structure and low manufacture cost.

BACKGROUND OF THE INVENTION

The conventional digital still camera (DSC) generally requires a mechanical-type light-blocking plate to block the light when exposure is finished and signal transform is executed in case that a non-progressive CCD (charge coupled device) is used. Therefore, the exposure time of CCD is controlled by the switch operation of the mechanical-type light-blocking plate.

FIG. 1 shows the conventional diaphragm structure for a DSC. As shown in this figure, the conventional diaphragm structure comprises an electromagnetic valve 10a, a connection means 11a and three light-blocking plates 12a. The electro-magnetic valve 10a is connected to those plates 12a through the connection means 11a such that the open/close of the plate 12a can be controlled by the electromagnetic valve 10a.

However, the above-mentioned diaphragm structure of the DSC employs three light-blocking plates 12a. The structure is complicated, bulky and makes the manufacture cost high. Moreover, the kind of diaphragm structure is only suitable for placing in front of the lens or behind the lens and is not suitable for placing within the lens.

It is the object of the invention to provide a diaphragm structure for DSC, which comprises a lens, a first light-blocking plate, and a second light-blocking plate. The first and second light-blocking plates have a first and a second aperture, respectively, and are moveably arranged within the lens. The two light-blocking plates have linear movement within the lens such that the apertures on the two plates can be staggered to each other or aligned, thus closing or opening the diaphragm. The present invention employs two-plate type light-blocking plates, and thus has simple structure. The diaphragm of the DSC can be controlled by the linear motion of the two light-blocking plates to simplify the structure and its assembly and to reduce costs. Moreover, the linear motion of the light-blocking plates in the present invention enhances the reliability of the DSC and enables the diaphragm to install within the lens.

The various objects and advantages of the present invention will be more readily understood from the following detailed description when read in conjunction with the appended drawing in which:

DETAIL DESCRIPTION OF PREFERRED EMBODIMENT

Figure 1:
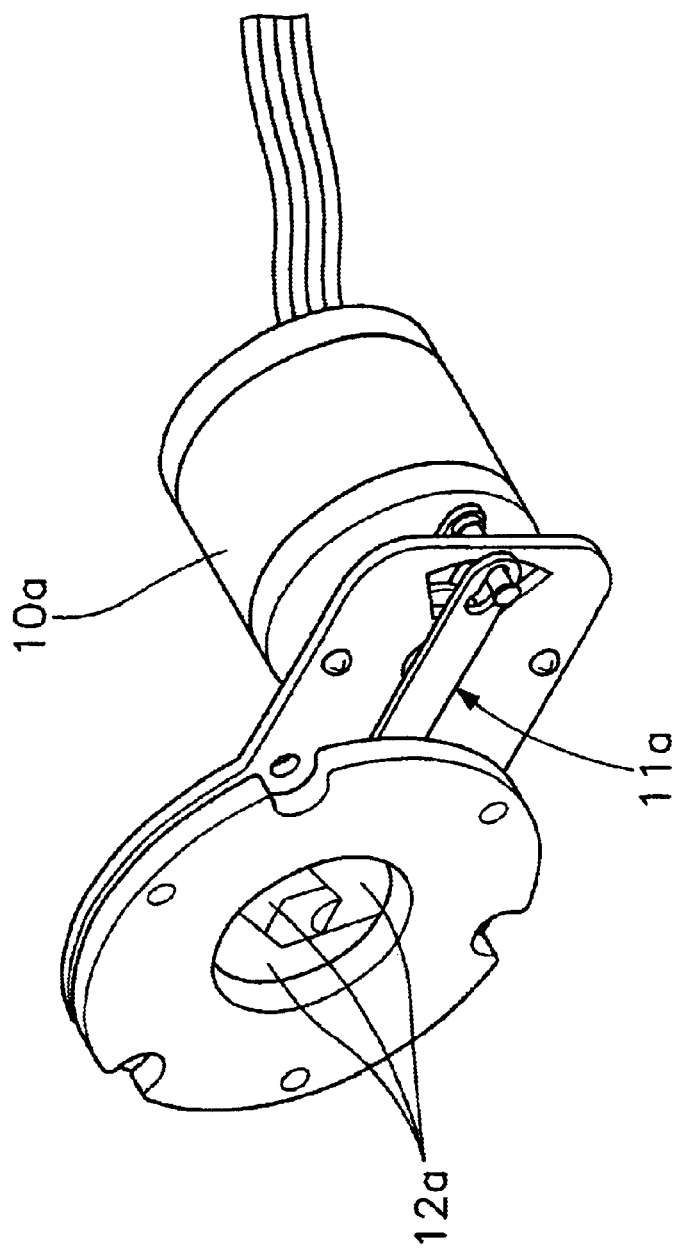
FIG. 1 is the perspective view of a conventional diaphragm of DSC.
Figure 2:
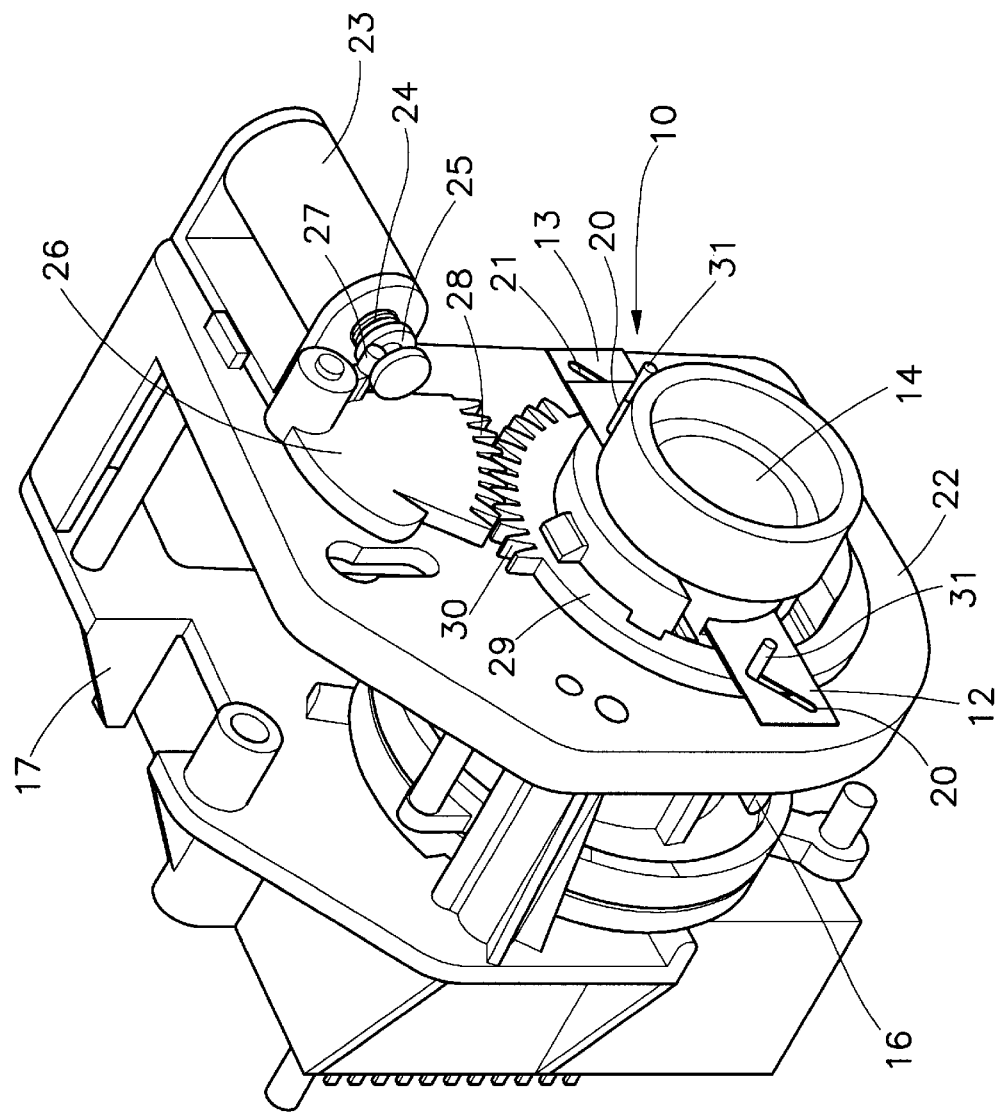
FIG. 2 is the perspective view of the first embodiment of the present invention.
Figure 3:
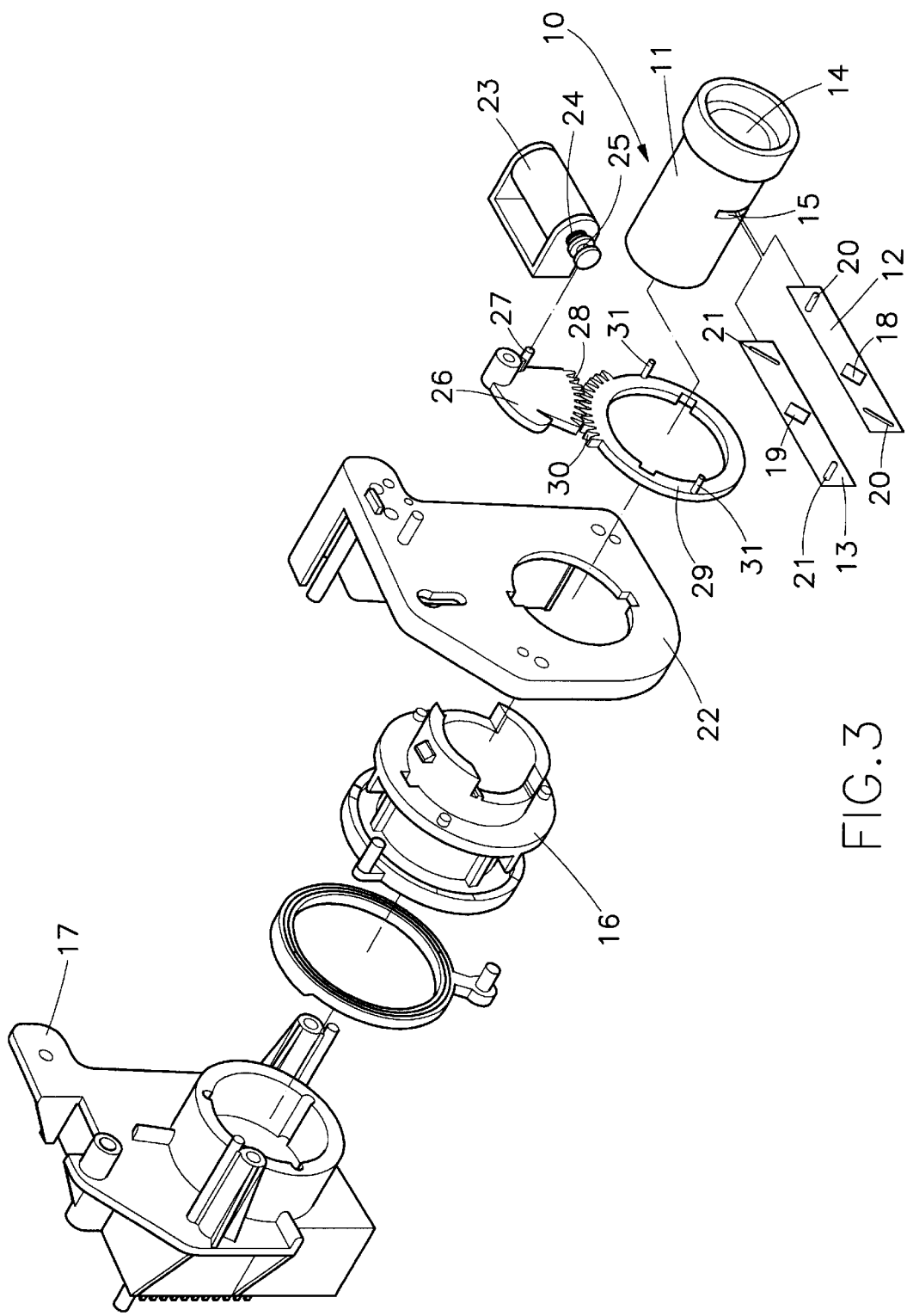
FIG. 3 is the exploded view of the first embodiment of the present invention.

As shown in FIGS. 2, 3, 4 and 5, the present invention provides a diaphragm structure of DSC. The diaphragm structure 10 of the present invention is arranged within the DSC and comprises a lens 11, a first light-blocking plate 12 and a second light-blocking plate 13. A passage 14 for the passing through of imaging light is arranged within the lens 11. A guiding groove 15 is arranged through both sides of the lens. The lens 11 is mounted on a lens set 16, which is arranged on a lens stage 17. However, since the lens set 16 and the lens stage 17 are well-known art, the detailed descriptions thereof are omitted here for clarity.

The first light-blocking plate 12 and the second light-blocking plate 13 are of rectangular shape and have a first aperture 18 and a second aperture on the center part thereof, respectively. The first aperture 18 and the second aperture 19 are of rectangular shape. Two first sliding grooves 20 are arranged on the both sides of the first aperture and such inclined that the distance between top ends is smaller than that between the bottom ends. Two second sliding grooves 21 are arranged on both sides of the second aperture and such inclined that the distance between top ends is larger than that between the bottom ends.

The first and second light-blocking plates 12 and 13 are stacked to each other and movably arranged within the guiding groove 15 such that these two plates 12 and 13 can be moved linearly in opposite direction. Moreover, the first sliding grooves 20 and the second sliding grooves 21 are inclined to be vertical to each other.

A cover 22 is arranged on the lens set 16, and an electromagnetic valve 23 is arranged on the cover 22 and functioned as power source. The shaft 24 of the electromagnetic valve 23 is provided with a conjoint groove 25. A sector-shaped connection rod 26 is pivotally arranged on the cover 22. The connection rod 26 has a conjoint body 27 corresponding to the conjoint groove 25 and a first tooth portion 28. A ring-shaped crank 29 is pivotally arranged on the lens set 16 and located at the front side or back side of the two light-blocking plates 12 and 13. The crank 29 has a second tooth portion 30, which engages with the first tooth portion 28. Two pushing shafts 31 are provided on the crank 29 and pass through the first sliding groove 20 and the second sliding groove 21, respectively. The connection rod 26 and the crank 29 together form a transmission means by which the power of the power source (the electromagnetic valve 23) can be transmitted to the first and second light-blocking plates 12 and 13, thus drives these two plates 12 and 13 to have relative linear movement.

Figure 4:
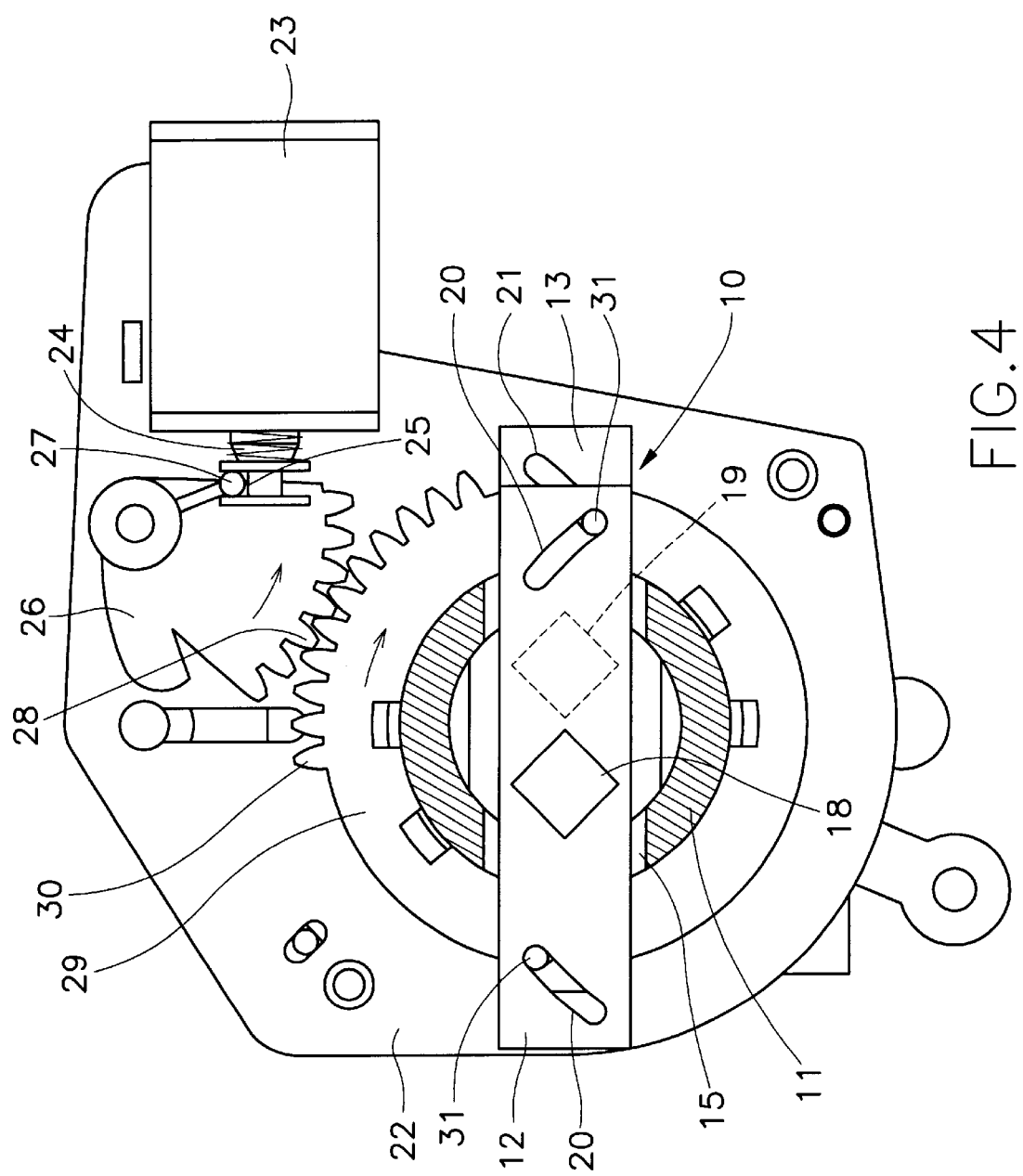
FIG. 4 is the cross section view of the first embodiment of the present invention.

As shown in FIG. 4, when the shaft 24 of the electromagnetic valve 23 shrinks, the conjoint groove 25 will drive the conjoint body 27 of the connection rod 26, thus rotates the connection rod 26 in counter-clockwise direction. The connection rod 26 will drive the crank 29 to rotate in clockwise direction through the first tooth portion 28 and the second tooth portion 30. At this time, the two pushing shafts 31 on the crank 29 can push the first and second sliding groove 20 and 21, thus drives the first and second light-blocking plates 12 and 13 to have relative linear movement. The first aperture 18 and the second aperture 19 on the first and second light-blocking plates 12 and 13 are staggered to each other such that the light passage 14 of the lens 11 is in closed state.

Figure 5:
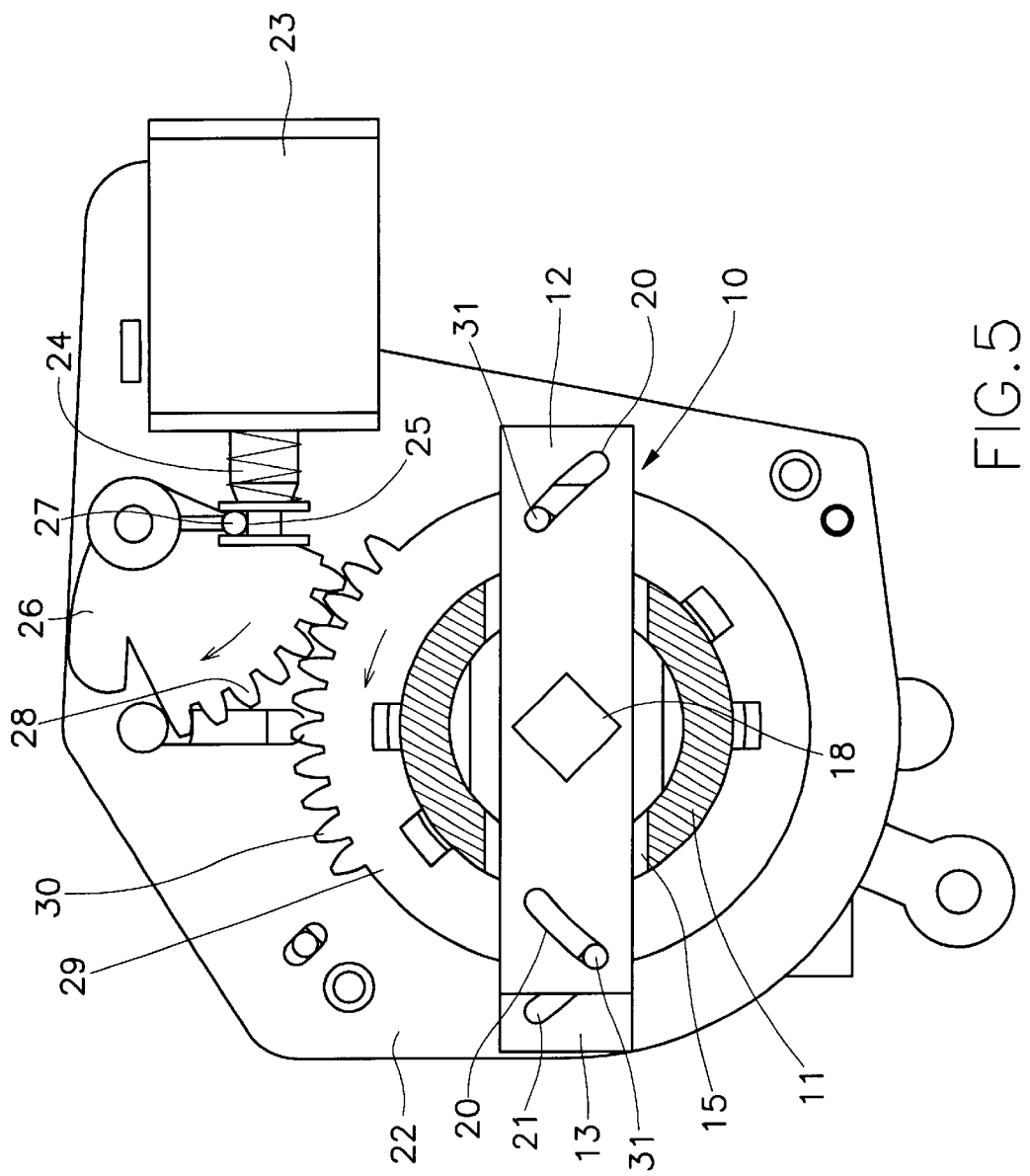
FIG. 5 is another cross section view of the first embodiment of the present invention.

As shown in FIG. 5, when the shaft 24 of the electromagnetic valve stretches, the conjoint groove 25 drives the conjoint body 27, thus rotates the connection rod 26 in clockwise direction. The connection rod 26 will drive the crank 29 to rotate in counter-clockwise direction through the first tooth portion 28 and the second tooth portion 30. At this time, the two pushing shafts 31 on the crank 29 can push the first and second sliding groove 20 and 21, thus drives the first and second light-blocking plates 12 and 13 to have relative linear movement. The first aperture 18 and the second aperture 19 on the first and second light-blocking plates 12 and 13 are aligned to each other such that the light passage 14 of the lens 11 is in open state.

The present invention adopts two-piece light-blocking plate 12 and 13 which have relative linear movement to control the open/close of the diaphragm, thus simplifies the structure and reduces the cost. Moreover, the linear-motion fashion of the two light-blocking plates 12 and 13 can enhance the reliability of the overall system.

Figure 6:
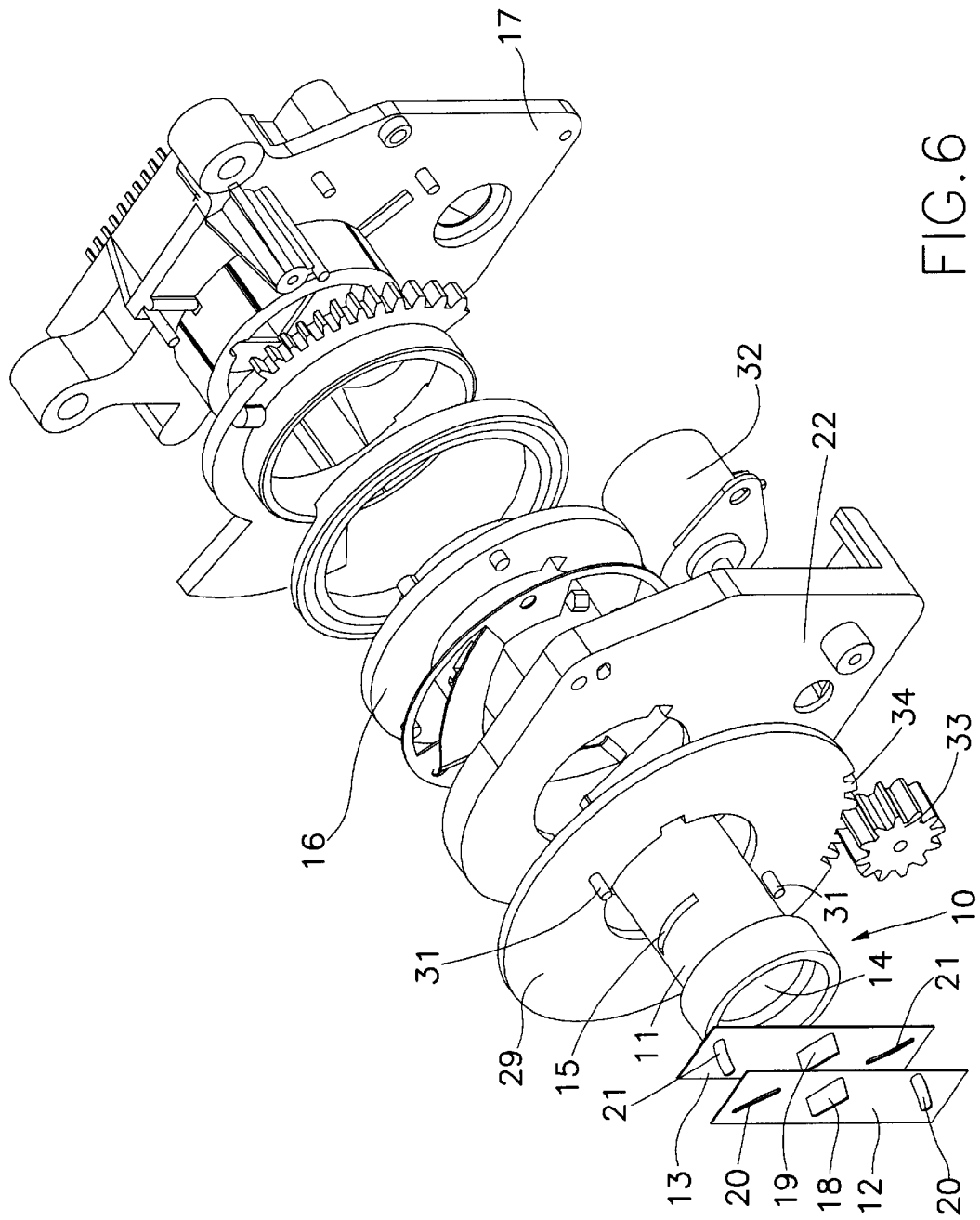
FIG. 6 is the exploded view of the second embodiment of the present invention.
Figure 7:
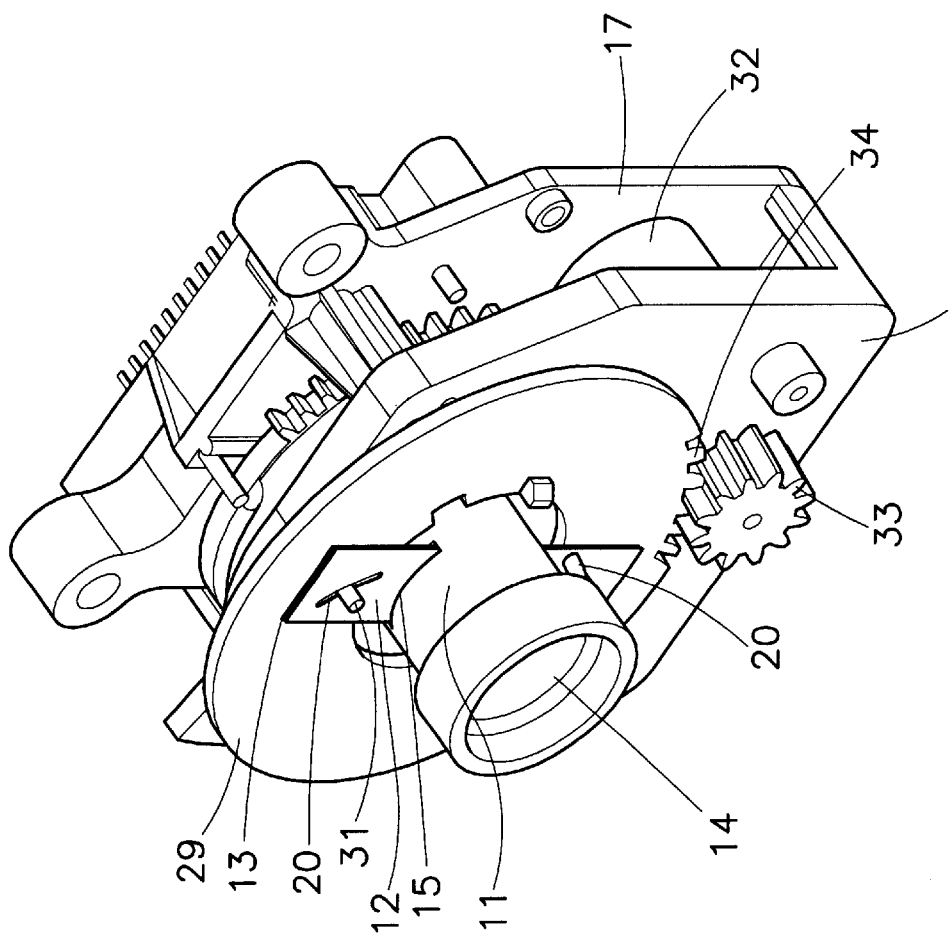
FIG. 7 is the perspective view of the second embodiment of the present invention.

With reference now to FIGS. 6 and 7, the present invention can also adopt a step motor 32 as a source of driving power. The step motor 32 us arranged on the top of the cover 22 and the shaft thereof is engaged with a pinion 33. A third tooth portion 34 is arranged on the crank 29 such that the pinion 33 together with the crank 29 form a transmission means. The pinion 33 will drive the crank 29 through the third tooth portion 34 in the clockwise or the counter clockwise direction when the shaft of the step motor 32 rotates. In other word, the step motor 32 can drive the first and second light-blocking plates 12 and 13 through the transmission means to move them in a linear direction. Moreover, the driving source can also adopt DC-motor or other device with coil means.

To sum up, the diaphragm structure of the present invention can overcome the problem of complicated structure, high cost and the difficulty of placing the diaphragm within the lens set.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A diaphragm structure for digital still camera and arranged within said digital still camera comprising:

a lens;

a first light-blocking plate having a first aperture, and a second light-blocking plate having a second aperture, said first and second light-blocking plates being movably arranged within said lens and in abutting relationship, said first and second light-blocking plates being moved linearly with said lens such that said first and second apertures can be aligned or staggered to each other and the operation of said lens set can be controlled;

a pair of first sliding grooves being arranged on both sides of said first aperture, and inclined such that the distance between top ends thereof is smaller than that between bottom ends, a pair of second sliding grooves being arranged on both sides of said second aperture, and inclined such that the distance between top ends thereof is larger than that between bottom ends, said first and second sliding grooves being vertical to each other, a crank being arranged at one side of said light-blocking plates, two pushing shafts being arranged on said crank and passing through said pair of first and second sliding grooves, responsive to rotation of said crank, said two pushing shafts driving said first and said second sliding grooves, thus driving said first and second light-blocking plates to have relative linear movement.

2. The diaphragm as in claim 1, wherein a guiding groove is provided on the lateral side of said lens such that said two light-blocking plates are movably arranged within said guiding groove.

3. The diaphragm as in claim 1, wherein said first and second light-blocking plates are of rectangular shape.

4. The diaphragm as claim 1, wherein said first and second apertures have corresponding shape.

5. The diaphragm as in claim 1, wherein said crank is driven by a driving source through a transmission means.

6. The diaphragm as in claim 5, wherein said driving source is an electromagnetic valve, a step motor, a DC motor or other device with coil.

* * * * *